United States Patent [19]
Moss
[11] 3,857,744
[45] Dec. 31, 1974

[54] METHOD FOR MANUFACTURING COMPOSITE ARTICLES CONTAINING BORON CARBIDE

[75] Inventor: James R. Moss, Golden, Colo.
[73] Assignee: Coors Porcelain Company, Golden, Colo.

[22] Filed: Jan. 19, 1970
[21] Appl. No.: 4,066

[52] U.S. Cl. .......... 156/60, 2/2.5, 106/43, 106/44, 117/37 R, 117/40, 156/89, 156/153
[51] Int. Cl. .......... B29c 27/30, C04b 35/52
[58] Field of Search .......... 117/37 R, 40; 106/43, 44, 106/45; 2/2.5; 156/60, 89

[56] References Cited

UNITED STATES PATENTS 2,839,413 7/1958 Taylor .......... 106/44
3,794,551 2/1974 Landingham .......... 156/89 X

FOREIGN PATENTS OR APPLICATIONS 1,581,760 8/1969 France .......... 2/2.5

*Primary Examiner*—Leland A. Sebastian
*Attorney, Agent, or Firm*—Reising, Ethington & Perry

[57] ABSTRACT

In accordance with the invention, a composite silicon impregnated boron carbide body bonded to a backing material for said body is manufactured by forming a boron carbide powder compact of the desired shape and size, coating a surface of the compact with boron nitride powder, impregnating the boron nitride coated boron carbide powder compact with silicon, removing from the surface of said body at least most of the boron nitride layer and any silicon deposited thereon, and then bonding the silicon impregnated boron carbide body to the organic resin backing material.

8 Claims, No Drawings

METHOD FOR MANUFACTURING COMPOSITE ARTICLES CONTAINING BORON CARBIDE

This invention relates to a method for manufacturing hard tough composite bodies particularly useful for armor plate, and more particularly to a method for manufacturing composites of silicon impregnated boron carbide bonded to a backing of organic resin.

It is known that hard tough light weight armor plate for vehicles or for personnel can be manufactured by forming a silicon impregnated boron carbide plate of the desired shape and size and then bonding this plate to a backing of organic resin, typically fiberglass reinforced polyester or epoxy resin. The silicon impregnated boron carbide provides excellent resistance to penetration by impacting projectiles and the fiber reinforced organic resin backing assures against penetration by any fragments of the silicon bonded boron carbide resulting from impacting projectives. It is also known that such composite armor plate can be manufactured by first forming a mixture of boron carbide powder and a small amount of organic binder such as wax or resin, pressing this mixture to form a self-sustaining compact thereof of the shape and size of the plate desired, impregnating this compact with molten silicon, preferably in a vacuum chamber, and then, after the silicon impregnated boron carbide plate has cooled, bonding thereto the fiber reinforced organic resin backing. However, in the manufacture of such a composite there is difficulty in attaining good bond strength between the silicon impregnated boron carbide and the organic resin backing chiefly because the irregular silicon coated surface of the silicon impregnated boron carbide body presents a surface which does not provide good adherence to the organic resin. Because of this it has heretofore been necessary, prior to bonding to the resin, to perform an expensive grinding operation on the surface of the silicon impregnated boron carbide body to remove the irregular silicon layer from the surface thereof.

The chief object of the present invention is to provide an improved low cost method for manufacturing such composites whereby there is eliminated the aforesaid difficulty of attaining a strong bond between the silicon impregnated boron carbide and the organic resin backing.

Briefly, this is accomplished in accordance with the invention by applying to the surface of the boron carbide powder compact which, after silicon impregnation, is to be bonded to the organic resin, a layer of a material, preferably boron nitride, which is not wetted by silicon and therefor to which silicon does not bond. Hence, after the silicon impregnation operation, the surface to which said layer has been applied is substantially free of silicon and the layer of boron nitride or other material applied can be easily removed, as by a light sand blasting operation, to thereby present a relatively smooth surface which forms a strong bond with the organic resin. The invention is especially useful for the manufacture of compound curved, armor plate. This is because plates which are compound curved rather than cylindrical or flat are not suitable for automated surface machining operations to remove the silicon from the surface thereof, as has heretofore been necessary, and hence, prior to the present invention, there has been requirement for a tedious hand machining operation on the compound curved plates to prepare the surface thereof for bonding to the organic resin.

The following specific example will serve to more fully illustrate the invention.

First there is formed a uniform mixture of boron carbide powder and a small amount, about 5 to 10 percent by weight, of an organic binder such as paraffin wax. The grain size of the boron carbide is not critical; any size from as small as 600 grit to as large as 120 grit, for example, can be used. This mixture is then cold pressed, as between matched dies or the like to form it into a compact of the shape and size desired for the plate. Then, in accordance with the present invention, there is applied to that surface of the plate which is eventually to be bonded to the resin, a thin layer of boron nitride powder. Here again the grain size is not critical; 325 mesh and finer boron nitride powder serves well though a smaller grain size or a larger grain size, within reasonable limits, can be used if desired. The boron nitride powder can be dusted onto the surface or, as is generally preferable, it can be mixed with water or other liquid to form a slurry and the slurry then sprayed, brushed, or otherwise applied to the surface of the compact. An example of a suitable slurry is: boron nitride powder — 325 mesh, 30 parts by weight; polyvinyl propylene, as a binder, two parts by weight; methyl alcohol, 100 parts by weight.

After the boron nitride powder layer has been applied and, if a slurry is used, after the layer has been dried, the compact is placed in a vacuum chamber together with a quantity of powdered silicon. The amount of silicon powder used should be sufficient to provide total impregnation of the compact and to assure total impregnation it is best to use at least a slight excess of silicon powder. The amount of silicon powder required can be easily calculated on the basis of the measured porosity of the compact. For example, if the porosity of the compact is 30 percent, then the amount of silicon powder should, by volume, be at least slightly in excess of 30 percent of the volume of the compact. After the compact has been placed in the chamber and the silicon powder placed thereover, the chamber is evacuated and the compact and the silicon powder are heated, while a vacuum is continued to be applied, to a temperature in excess of the melting temperature of the silicon. A temperature of from about 1450°C to 1550°C is satisfactory. During the early stages of the heating operation the wax binder vaporizes and is removed from the chamber by way of a vacuum being applied. When the silicon melts, it totally impregnates the compact by reason of capillary action. However, because boron nitride is not wetted by silicon, little if any of the silicon deposits on or adheres to the surface of the compact which is coated with the boron nitride powder layer.

After impregnation is complete the silicon impregnated boron carbide plate is removed from the vacuum chamber and allowed to cool and the boron nitride layer and any deposits of silicon thereon can be easily removed by a light sandblasting operation. It is not essential to remove all of the boron nitride and generally at least some small amounts thereof will remain adhered to the plate. After the sandblasting or similar operation for removal of most or all of the boron nitride, the resulting surface of the plate is relatively smooth and is excellent for bonding to organic resin.

Hence, as the next operation, polyester resin or other resin as desired, is applied along with fiberglass matting or cloth all in accordance with conventional and well known techniques, to thereby provide the desired fiber reinforced organic resin backing for the armor plate.

Whereas boron nitride is much preferred, it is within the purview of the invention to use in place thereof other materials which are not wetted by silicon and hence to which silicon does not strongly adhere. Also the invention can be used for the manufacture of silicon bonded carbides other than boron carbide, for example titanium carbide or silicon carbide and for the manufacture of carbide bodies impregnated with a metal or metals instead of silicon.

Hence, while the invention has been described specifically with reference to a preferred embodiment, changes may be made all within the full and intended scope of the claims which follow.

I claim:

1. In a method for manufacturing an impregnated carbide body wherein a compact of carbide powder is contacted with molten impregnant selected from the group consisting of the metals and silicon to cause the impregnation of said body with said impregnant, the improvement which comprises applying to a surface of said compact, prior to contacting said compact with said molten impregnant, a material which is not wetted by said molten impregnant, said material thereby inhibiting the adherence of said impregnant to said surface.

2. A method as set forth in claim 1 wherein said material is boron nitride.

3. A method as set forth in claim 1 wherein said carbide is boron carbide.

4. A method as set forth in claim 1 wherein said impregnant is silicon.

5. A method as set forth in claim 1 wherein after said impregnation an organic resin is bonded to said surface.

6. A method as set forth in claim 1 wherein at least most of said material is removed from said surface prior to bonding the organic resin thereto.

7. A method as set forth in claim 1 wherein said carbide is boron carbide, said impregnant is silicon and said material is boron nitride.

8. A method as set forth in claim 6 wherein said carbide is boron carbide, said impregnant is silicon and said material is boron nitride.

* * * * *